United States Patent [19]
Geisthoff

[11] 3,871,463
[45] Mar. 18, 1975

[54] DEVICE FOR CONNECTING A TRACTOR WITH AN AGRICULTURAL IMPLEMENT
[75] Inventor: Hubert Geisthoff, Lohmar, Germany
[73] Assignee: Jean Waltersheid GmbH, Siegburg-Lohmar, Germany
[22] Filed: Aug. 21, 1973
[21] Appl. No.: 390,198

[30] Foreign Application Priority Data
Aug. 23, 1972 Germany.......................... 2241434

[52] U.S. Cl............. 180/14 B, 180/53 R, 280/420, 280/479 R, 280/508
[51] Int. Cl............................................. B60d 1/08
[58] Field of Search ............. 180/14 B, 53 R, 14 R; 280/292, 446 R, 446 A, 478 R, 478 A, 478 B, 479 A, 479 R, 490 R, 490 A, 508, 420–422

[56] References Cited
UNITED STATES PATENTS

| | | | |
|---|---|---|---|
| 2,528,784 | 11/1950 | Rich.................................. | 180/53 R |
| 2,636,568 | 4/1953 | Rutishauser...................... | 180/53 D |
| 3,074,501 | 1/1963 | Lane et al......................... | 180/53 D |
| 3,220,751 | 11/1965 | Tweedale.......................... | 280/479 R X |
| 3,420,390 | 1/1969 | Taggart............................. | 280/421 UX |
| 3,427,046 | 2/1969 | Sommer et al.................... | 280/479 R |
| 3,432,184 | 3/1969 | Tweedy............................. | 280/479 R |
| 3,489,431 | 1/1970 | McKeon et al................... | 280/478 R |
| 3,494,657 | 2/1970 | Tantlinger et al................. | 280/421 X |
| 3,716,253 | 2/1973 | Gniffke et al..................... | 280/446 R X |

Primary Examiner—M. Henson Wood, Jr.
Assistant Examiner—Andres Kashnikow
Attorney, Agent, or Firm—Edmund M. Jaskiewicz

[57] ABSTRACT

A device for connecting an agricultural implement or machine to a tractor provides on the implement a mounting plate having extending therefrom a notched aligning bar and an aligning opening. On the back of the tractor is provided a pivotally mounted catch-arm which is actuated by a power lift. The catch arm engages on an edge of the mounting plate and brings the mounting plate into proximity with a notched aligning plate and a coupling bolt mounted on the tractor. The bolt is received within the aligning opening on the mounting plate and is latched in position to couple the mounting plate to the tractor.

18 Claims, 7 Drawing Figures

DEVICE FOR CONNECTING A TRACTOR WITH AN AGRICULTURAL IMPLEMENT

The present invention relates to a device for connecting a vehicle with an implement, trailer, machine, or the like, more particularly, to such a device for connecting a tractor with an agricultural implement and consisting of mutually self aligning connecting means on both the tractor and the implement.

The so-called three-point attachment device has been commonly used for connecting a tractor to various forms of agricultural machines and implements. The connecting rods and guide structures of this attachment device reduce considerably access to the region between the tractor and the traction shaft of the trailer connected thereto. As a result, the operation of drivingly engaging the transmission shaft of the implement with the power take-off shaft of the tractor is rendered more difficult. Further, the presence of any loose connecting rod members in such a confined space is dangerous and could cause serious accidents. A further disadvantage is that the connecting rod guide system of the three-point attachment was essentially devised for use with a plow but different kinematic conditions and forces exist when different types of implements or machines are attached to the tractor. However, the existing connecting rod guide structure is not satisfactory for connecting all forms of agricultural implements and merely represents a compromise.

It has been proposed to provide an agricultural implement with a triangular frame structure for connection to the above described three-point attachment device on the tractor (German AS No. 1 215 419). However, this proposed structure is disadvantageous in that the three-point attachment device is still associated with the tractor and the triangular frame structure may obstruct and hinder various operations such as, for example, when used in a trailer or other machine which is being driven from the tractor.

A further disadvantage of the proposed device is that it is not possible to achieve a driving connection between the transmission shaft of the implement and the power take-off shaft of the tractor at the same time that the connection is made between the triangular frame of the implement and the three-point attachment of the tractor. To achieve such a simultaneous connection it is necessary to make the transmission shaft itself a component element of the three point attachment device. The difficulties in making the driving connection are due to the necessity for both lateral and vertical alignment operations. Within a severely limited space, the operator must manually make the connection between the transmission shaft of the implement and the power take-off shaft of the tractor. In addition, hydraulic, electrical and where provided pneumatic connections must similarly be made manually. In addition to making the above described connection the operator must also accomplish manually a locking of the connections. Moreover, as far as presently known, there is no automatic coupling or connection system for traction jaws in agricultural machines.

It is therefore the principal object of the present invention to provide a novel and improved device for the connection of an agricultural implement or machine with a tractor.

It is another object of the present invention to provide such a device which provides for automatic connection between the implement and the tractor without the necessity for the operator leaving his seat on the tractor.

It is a further object of the present invention to provide such a device wherein there is automatic connection and disconnection of a traction coupling as well as for the operation of implements suspended from or mounted to the connecting rod guides.

It is still another object of the present invention to provide such a device in which there is automatic connecting and disconnecting of the power drive between the tractor and the implement and of any hydraulic, electrical and pneumatic connections which may be involved so as to increase operational safety and to reduce to a bare minimum connecting elements in the region between the tractor and the implement.

In accordance with the present invention there is provided a device for connecting an agricultural implement, machine or the like to a tractor which may comprise a mounting plate on the implement. On the back of the tractor there is provided a catch arm means which is pivotally mounted and includes at least one pivotally mounted hook member engagable with an edge of the mounting plate. The catch arm means is provided with a notched aligning plate which is engagable with a notched alignment bar extending from the mounting plate. The mounting plate is also provided with an opening which receives a coupling bolt extending from the tractor. Latching or locking means is provided on the implement for lockingly coupling the bolt to the mounting plate. The catch arm means is actuated between raised and lowered positions by a hydraulic or mechanical power lift mechanism. Also mounted on the rear of the tractor are hydraulic, electrical and pneumatic connections which are connectable with mating connections on the mounting plate when the mounting plate has been aligned with respect to the tractor.

The structure according to the present invention permits connecting and disconnecting operations to be completed without assistance from additional personnel. The implement or machine which is to be attached is provided with a mounting plate adapted to fit to the tractor and as a result it is possible to achieve the most favorable kinetic conditions for each particular implement, machine or appliance which is to be connected to the tractor.

Other objects and advantages of the present invention will be apparent upon reference to the accompanying description when taken in conjunction with the following drawings, which are exemplary, wherein;

Proceeding next to the drawings wherein like reference symbols indicate the same parts throughout the various views a specific embodiment and modifications of the present invention will be described in detail.

Figure 1:
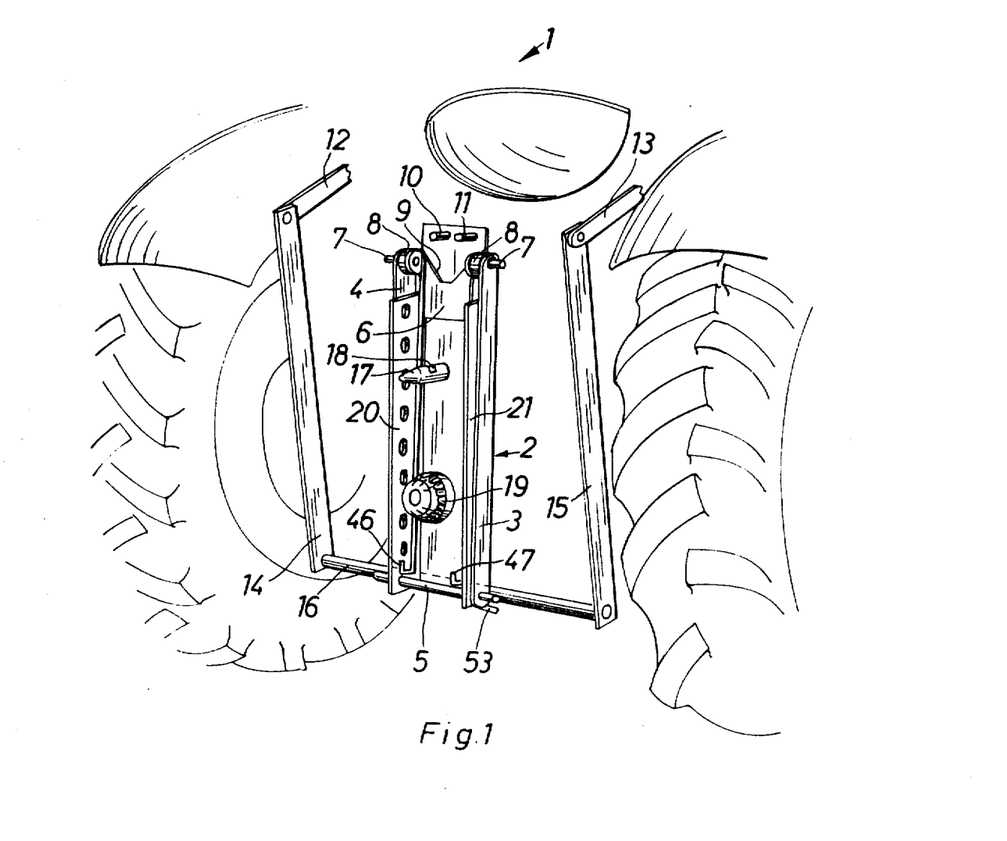
FIG. 1 is a perspective view of the rear of a tractor provided with the coupling and connecting elements of the present invention.
Figure 5:
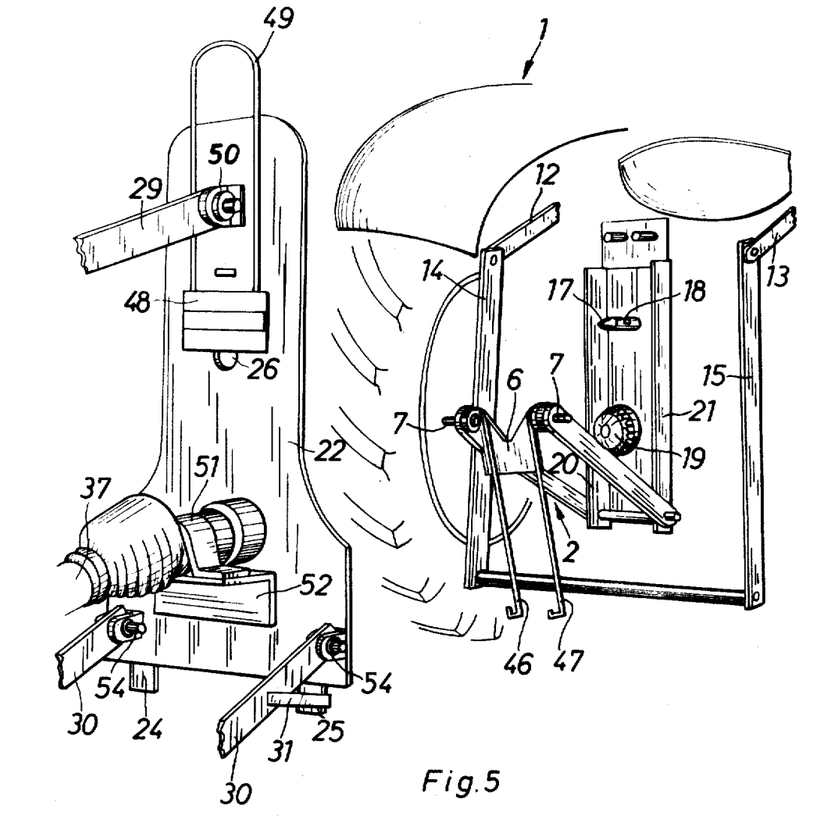
FIG. 5 is a perspective view looking from the implement toward the tractor and showing the positions of the connecting elements on the manure spreader or the tractor prior to mutual connection.

As can be seen in FIGS. 1 and 5 an agricultural tractor is indicated generally at 1 with only those structural elements of the tractor being illustrated which are necessary for the disclosure of the invention.

Such a tractor is generally provided with a pair of spaced parallel vertically extending perforated bars 20, 21 on the rear end of the tractor. On the lower ends of the bars 20, 21 there is mounted a shaft or axis 5 upon which are pivotally mounted a pair of spaced parallel links 3 and 4 which are components of a catch arm indicated generally at 2. In the event the tractor is not provided with the perforated bars 20, 21 suitable mounting blocks must be provided on this part of the tractor to pivotally support the links 3 and 4.

Between the upper ends of the links 3 and 4 there is pivotally mounted an alignment plate 6 having an upwardly directed V-shaped notch or cut-out portion 9 in its upper edge. Also at the upper ends of the links 3 and 4 are pivotally mounted bearing shafts 7 upon which are mounted pressure rollers 8. The links 3 and 4 are so mounted on their shaft 5 that in the lowered position of the catch arm 2 the links 3 and 4 are also pivotable in the lateral directions. The angle of pivoting of the catch arm 2 with respect to the tractor is limited by stops 53 extending from the lower ends of the links 3–4 underneath the shaft 5.

The alignment plate 6 is additionally provided with catch hooks 46 and 47 which pivot with the plate 6 as the catch arm is lowered.

The tractor 1 is usually equipped with a power lift of which only the parallel arms 12 and 13 are shown. Guide members or connecting rods 14 and 15 are pivotally connected to the arms 12 and 13 and the lower ends of the rods 14 and 15 are connected by a shaft 16. When no implement or trailer is attached to the tractor the power lift will be in its raised position and its arms 12, 13 and rods 14, 15 together with the shaft 16 which acts upon the stops 53 will maintain the catch arm assembly 2 in its raised position.

Extending outwardly from the rear portion of the tractor 1 is an alignment bolt 17 which is substantially parallel with the longitudinal axis of the tractor and substantially perpendicular to the alignment plate 6 when in its raised position as shown in FIG. 1. The bolt 17 has a transverse groove 18 on its upper portion and its outer end is provided with a conically tapering conformation.

Coupling elements 10 and 11 which may be for hydraulic, pneumatic or electrical energy lines are mounted on a plate on the rear of the tractor and are adapted to meet with corresponding coupling elements on the implement to be connected. The tractor 1 also comprises a power take-off shaft adapted to be driven from the engine in the manner known in the art and provided with an externally toothed conical or bevel-shaped coupling element 19 of a quick detachable coupling device.

It is pointed out that agricultural tractors are generally provided with a hydraulic lift. Therefore, a connecting rod suspended element such as the rods 14, 15 and shaft 16 can be readily mounted on the power lift and used for the connecting operation with the catch arm or with one of the connecting guide members. The actuation of the catch arm assembly by a mechanical or hydraulic power drive is desirable since many agricultural implements are relatively light in weight and have small inertia. It is therefore difficult to operatively connect such light weight implements merely by driving the tractor up to the implement and depending upon contact between the tractor and implement to make the connection.

Not only is an operative connection made between the implement and with the quick detachable coupling element of the power take-off shaft as described above.

The transmission shaft of the implement is included in the connecting operation since connection of the mounting plate is made in the axial direction with respect to the power take-off shaft of the tractor.

Figure 2:
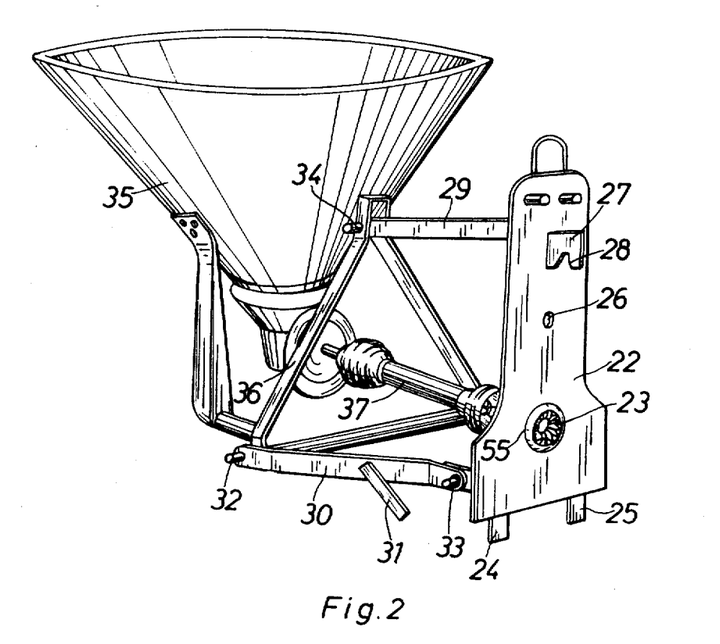
FIG. 2 is a perspective view of a fertilizer spreader as an implement provided with the coupling and connecting elements cooperating with the corresponding elements on the tractor.

In FIGS. 2 and 5 there is illustrated a particular agricultural implement in the form of a fertilizer spreader device 35 provided with coupling elements according to the present invention which are connectable with corresponding elements on the tractor 1. The spreader 35 is provided with a frame 36 the upper end of which is pivotally connected by bolts 34 to a top guide member 29 and the lower end of which is pivotally connected by bolts 32 to a pair of parallel bottom guide members 30. The guide members 29 and 30 thus form a parallel drive transmission. As may be seen in FIG. 5, the top guide member 29 is pivotally connected to a bearing block 50 on the rear face of mounting plate 22 and the bottom guide members 30 are both pivotally connected to bearing blocks 54 also on the mounting plate.

On the front face of mounting plate 22 there is provided a longitudinally extending alignment bar 27 which is substantially perpendicular to the plate 22 and which is provided with a substantially V-shaped notch 28 in its downwardly directed edge. The plane of the notch 28 is substantially perpendicular to the plate of the V-shaped recess 9 in the alignment plate 6 on the catch arm assembly. The mounting plate 22 is further provided with an opening 26 through which the bolt 17 on the tractor may be inserted. Alignment bar 27 and opening 26 as well as the alignment plate 6 and bolt 17 occupy relative positions so as to provide for precise central alignment of the mounting plate with respect to the bolt 17.

The mounting plate 22 is also provided with an opening 55 through which projects the outer coupling element 23 of a quick release coupling device. The coupling element 23 is mounted on the end of a transmission shaft 37 one end of which is journaled in an upright bearing block 51 attached to a bracket 52 extending from the rear face of the mounting plate as shown in FIG. 5. The shaft 37 transmits driving power to the fertilizer spreading device 35 and together with the guide members 29, 30 and mounting plate 22 are component elements of the fertilizer spreader 35. Since the spreader 35 is movably attached to the mounting plate 22 by means of a parallel link transmission the drive shaft 37 will not be subjected to longitudinal displacement. Because of the pivotal movement of the guide members 29 and 30 the drive shaft 37 may be provided with universal joints at both ends thereof with the centers of these joints being disposed in the planes of connection of both ends of the rod members. The transmission shaft between the universal joints may thus have a length equal to the connecting guide members 29 and 30. This will enable protecting housings for the universal joints to be fixably mounted on the implement and on the mounting plate and need not be supported or mounted on the transmission shaft. This protective structure provides full and comprehensive protection to operating personnel against any accidents. On smaller agricultural implements the transmission shaft may actually replace one of the connecting guide members. Further, since an end of the transmission shaft 37 is fixed with respect to the mounting plate 22 there is the additional advantage of eliminating any necessity for fixing the coupling element associated with the transmission shaft with respect to the mating coupling element on the power take-off shaft.

The mounting plate 22 thus functions as a shield and provides axial security with respect to the implement. No longitudinal forces will occur with a non-sliding shaft so that the connection of the transmission shaft and power take-off shaft will not require any particular axial safety provisions. The simultaneous automatic coupling of the transmission shaft with the power take-off shaft significantly simplifies the work as it eliminates the previously pains-taking and dangerous operation of establishing the driving connection. One of the coupling elements of the quick release coupling device between the power take-off shaft and the transmission shaft is resiliently mounted in an axial direction to further facilitate connection.

The bottom guide members 30 of the appliance 35 have catch or retaining lugs 31 mounted thereon which are engagable by the shaft 16 of the power lift during lifting of the implement 35. On the rear face of the mounting plate 22 or facing the implement 35 there is provided a latching or locking element 48 above the opening 26 so as to be engagable with the groove 18 of the bolt 17 when the bolt is inserted through the opening. The locking element 48 is provided with an actuating bracket or handle 49. The mounting plate 22 is also provided with feet 24 and 25 which position the bottom edge of the mounting plate 22 above the surface of the ground.

Figure 3:
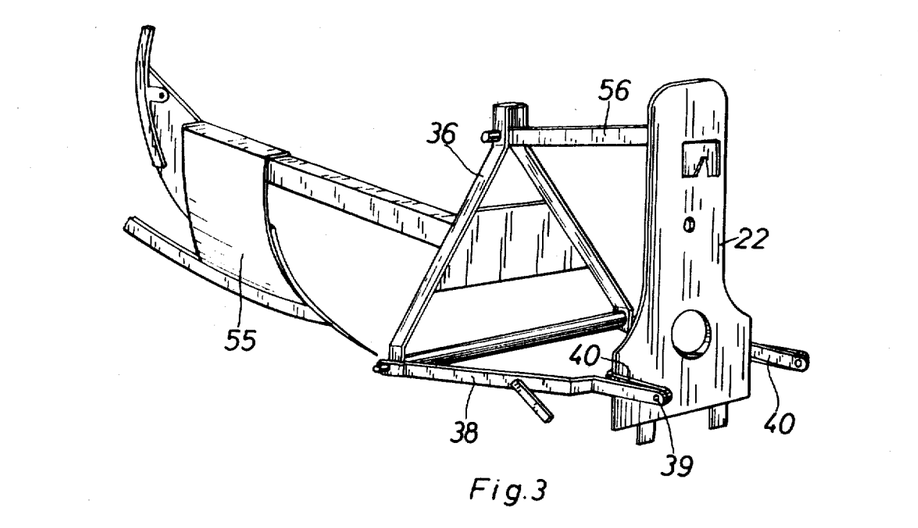
FIG. 3 is a view similar to that of FIG. 2 but where the implement comprises a plow.

In FIG. 3, the agricultural implement comprises a plow 55 which is similarly equipped with a mounting plate 22 for automatic connection to a tractor 1. However, the mounting plate is not provided with a bearing mount or a transmission shaft and the ends of the bottom guide members 38 are pivotally connected at 39 to beams 40 which are extended beyond the front face of the mounting plate. The beams 40 are attached to the mounting plate. The tractor may also be provided with a suitable retaining structure so as to provide additional support for the beams 40 so that high traction forces will not affect the mounting plate. This is important because a plow demands different and particular kinematic relationships during adjustments. In addition, the top guide member 56 is of a variable length to allow for adjustment of the depth of plowing and the bottom guide members 38 may be provided with retaining lugs, not shown, whereby the power lift of the tractor can apply to the plow downwardly directed forces.

Figure 4:
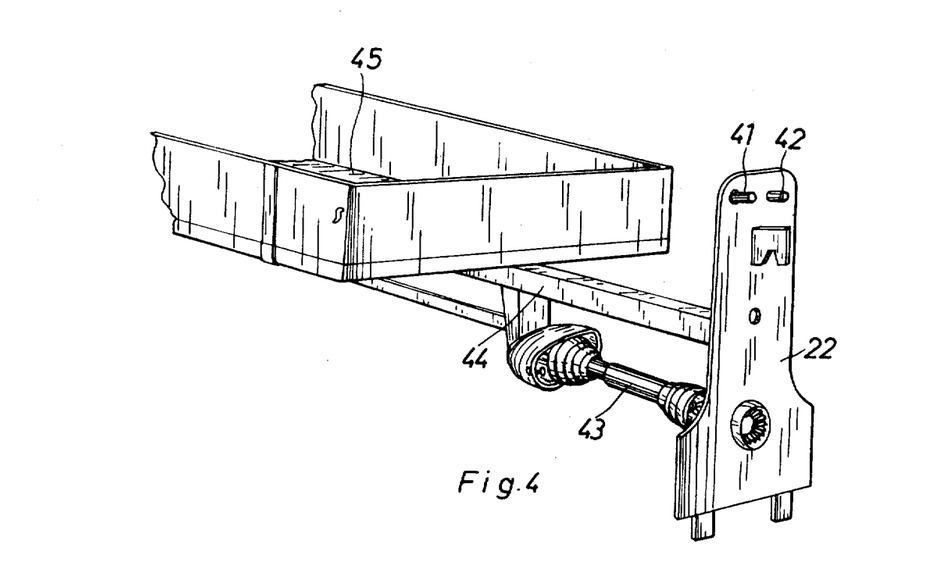
FIg. 4 is a view similar to that of FIG. 2 but wherein the implement comprises a manure spreader.

In FIG. 4, the implement is in the form of a manure spreader 45 which the mounting plate 22 is attached.

The mounting plate 22 is provided with a traction coupling on its face directed to the manure spreader and is maintained in connection by a cross bolt in the traction eye of the traction shaft 44. The power transmission shaft which drives the manure spreader 45 must be axially displacable so as to be telescopic. In addition the mounting plate 22 is provided with suitable connections 41 and 42 for pneumatic brake lines and electric leads to the rear brake lights and registration plate illumination system eventually provided on such an implement. The connections 41 and 42 are located so as to be connectable to mating coupling elements 10 and 12 on the tractor 1 and to be automatically engaged coupled when the mounting plate is brought into the proper position. The provision of the connectors for hydraulic, electric and pneumatic lines on the mounting plate and tractor prevents disconnection of these lines during operation since the mounting plate is fixed with respect to the tractor during operation.

While not shown in the drawings, a suitable structure such as springs or guides may be employed to maintain the mounting plate 22 of the implement 45 in a position which is perpendicular to the traction shaft 44. This perpendicular positioning can also be accomplished by appropriate selection of the center of gravity of the mounting plate.

The mounting plate may also be fixed with respect to the tractor by a suitable latching hook provided on either the tractor or vehicle and adapted to engage automatically in the other of these two parts. When such a latching hook is employed it is preferable that the mounting plate be attached to the vehicle in a vertical plane.

Figure 6:
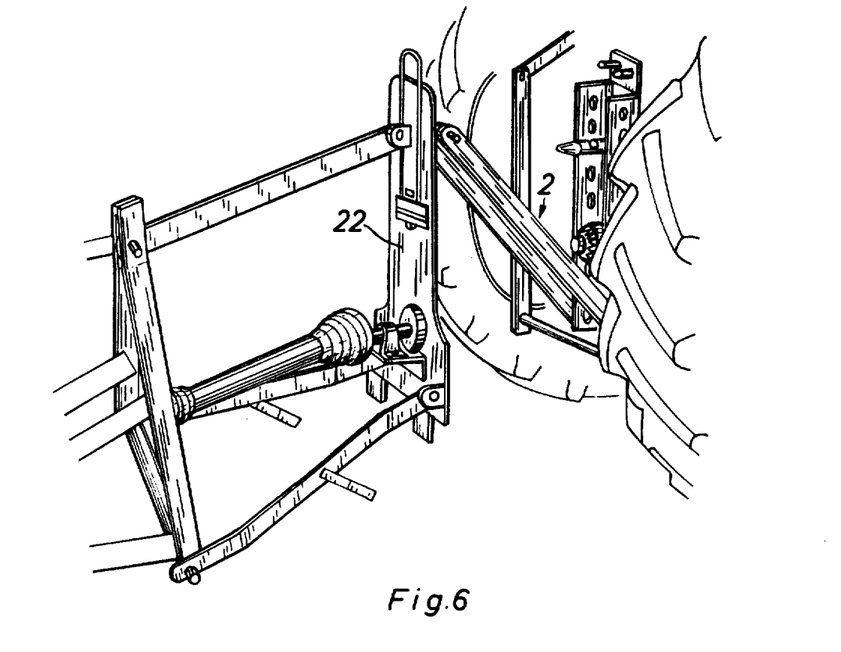
FIG. 6 is a view similar to that of FIG. 5 but at a slightly different angle showing the initiation of the coupling operation.
Figure 7:
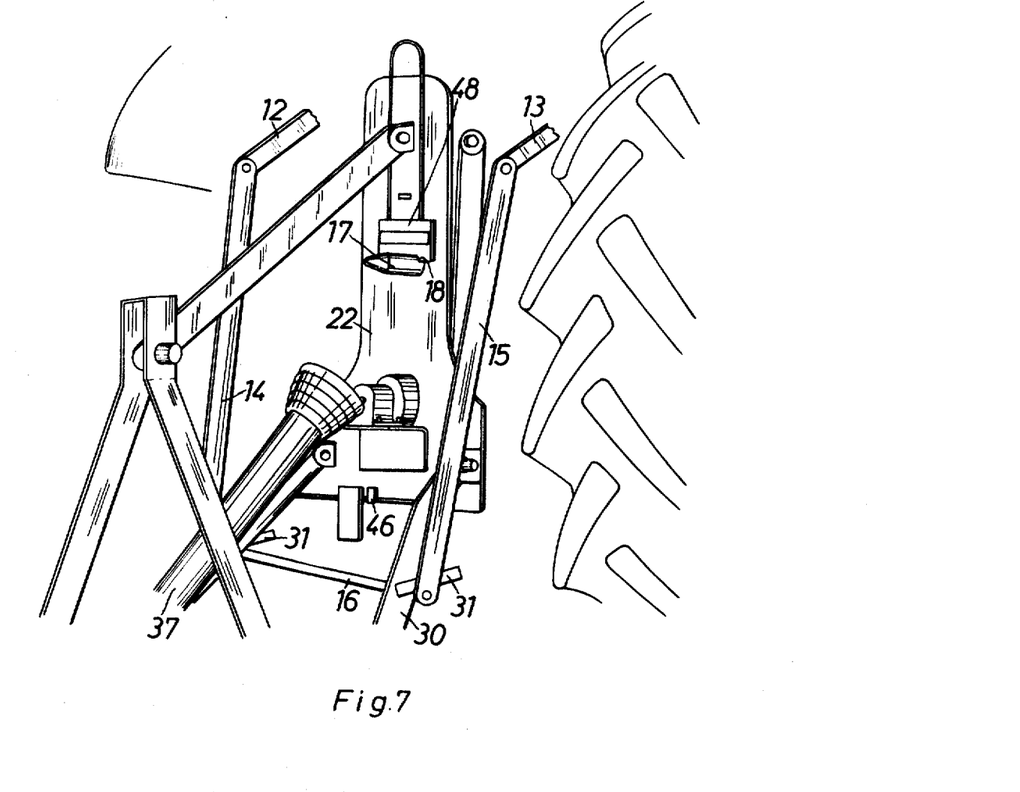
FIG. 7 is a view from approximately the same angle as of FIG. 5 and showing the completed coupling operation.

The functioning of the device of the present invention during the connecting or coupling operation is illustrated in FIGS. 5-7 wherein an artificial spreader such as illustrated in FIG. 2 is connected to a tractor of the type as shown in FIG. 1.

Initially, the power lift of the tractor is lowered so that the guide rods 14 and 15 are lowered and are thus moved out of the range of the stops 53 to release the catch arm assembly 2. The catch-arm assembly will now pivot about its shaft 5 into the position as shown in FIG. 5. The tractor 1 is now driven in reverse towards the implement so that the catch arm assembly 2 is moved in the direction towards the mounting plate 22 which is facing towards the tractor. The pressure rollers 8 on the catch arm assembly 2 will engage the front surface of the mounting plate 22 and on further movement of the tractor and catch-arm assembly toward the implement will roll upwardly on the mounting plate 22 so as to pivot the catch-arm assembly 2 upwardly. The catch-arm assembly 2 will continue to pivot upwardly until the notch 9 of the alignment plate 6 engages the notch 28 of alignment plate 27. The latch hooks 46 and 47 of the catch-arm assembly will hook under the bottom edge of the mounting plate 22 which is spaced above the surface of the ground by means of the feet 24 and 25. During further approach of the tractor 1 toward the mounting plate 22 (FIG. 6) the mounting plate 22 will be laterally aligned by the lengths 3 and 4 which are now guided laterally by the perforated bars 20 and 21. The mounting plate 22 will be raised until bolt 17 becomes inserted into opening 26 and the coupling element 23 of the transmission shaft 37 is coupled to the corresponding coupling element 19 on the power take-off shaft of the tractor.

The relative movement and alignment between the tractor and the implement is now completed and the locking element 48 is engaged into the groove 18 of the bolt 17 so as to maintain the mounting plate 22 in a fixed position with respect to the tractor and to also maintain the coupling elements 19 and 23 in proper coupled relationships.

The power lift can be further lowered to such an extent that the shaft 16 interconnecting the guide rods 14 and 15 will be engaged by the retaining lug 31 on the bottom guide members 30. Raising of the power lift of the tractor will thus raise the fertilizer spreader 35 which is secured to the pivotally mounted guide members 29 and 30. The spreader can be lifted off the ground and into working position.

Disconnection of the device involves the same operations performed in the reverse sequence after the power lift and the locking element 48 have been released by means of the actuating bracket 49.

It is pointed out that the catch-arm may also be constructed in the form of an elbow lever in order to reduce the force to be applied to the arm. The catch-arm assembly may also be mounted upon the shield instead of upon the tractor as disclosed. In such a modification, however, suitable guide surfaces must be provided on the tractor for engagement by the pressure rollers and the mounting plate itself may actually comprise a frame construction.

It is further pointed out that the conventional three-point attachment device and/or one or more traction coupling devices in the form of loops or hooks may be mounted on the mounting plate.

The connection device of the present invention may also be applied between other combinations of vehicles other than the tractor or agricultural implement as disclosed herein. For example, the connection device may be applied to two or more implements connected to each other, to trailers, or combined with trailers and implements. The mounting plate may also be employed as a supporting structure for a cable winch, pump, hydraulic motor, energy power generating plant, three point attachment device or any other component or unit which might be desirable in this regard. All these listed units are particularly adaptable for the connection device of the present invention since they may all be quickly and efficiently connected by means of a quick detachable coupling. The connection device may also be applied to frontal as well as rear attachment as disclosed herein. Completion of the coupling or connection operation may be communicated to the operator by a suitable optical or acoustical signal as known in the art. In addition, a suitable direction scanning device may be provided where the tractor operator's vision is impaired in order that the connection operation is facilitated.

The present invention may also be applied to various forms of motor vehicles including trucks and construction machinery.

It will be understood that this invention is susceptible to modification in order to adapt it to different usages and conditions, and accordingly, it is desired to comprehend such modifications within this invention as may fall within the scope of the appended claims.

What is claimed is:

1. In a device for connecting an agricultural implement to a tractor, the combination of a mounting plate on the implement, catch arm means on said tractor for engaging such implement mounting plate, vertical and horizontal alignment means on said catch arm means, said mounting plate having alignment means thereon engagable with said catch arm alignment means for aligning said implement mounting plate with respect to said tractor, and means on said tractor and mounting plate for coupling said mounting plate to said tractor.

2. In a device as claimed in claim 1 and one of hydraulic or mechanical power lift means for actuating said catch arm means between raised and lowered positions.

3. In a device as claimed in claim 2 wherein said implement comprises an appliance and a plurality of rod guide members connecting said appliance to said mounting plate, said catch arm means being engagable with said rod guide members to assist in one of the operations of said rod guide members and in the operation of the appliance.

4. In a device as claimed in claim 1 wherein said tractor has a power take-off shaft, a drive shaft on said implement for operation thereof and having one end extending through said mounting plate, detachable coupling means on said drive shaft at one end for coupling with said tractor power take off shaft.

5. In a device as claimed in claim 1 and a plurality of mounting brackets on said implement mounting plate, a corresponding plurality of rod guide members each having one end thereof pivotally connected to said brackets, said implement comprising an appliance pivotally connected to the other end of said rod guide members.

6. In a device as claimed in claim 5 wherein said rod guide members have equal lengths, said implement having a drive shaft with a universal joint on each end thereof, the length between the centers of the joints being equal to the lengths of said rod guide members.

7. In a device as claimed in claim 1 and traction coupler means on said mounting plate for connection to a traction bar of an agricultural implement.

8. In a device as claimed in claim 7 and means for aligning said mounting plate in a substantially perpendicular plane with respect to the said traction bar.

9. In a device as claimed in claim 1 and mating connector elements on said mounting plate and tractor for one of an electrical, hydraulic and pneumatic line.

10. In a device as claimed in claim 1 wherein said coupling means comprises a bolt extending from said tractor, said mounting plate having an opening therein to receive said bolt, and means on said mounting plate for lockingly engaging said bolt upon insertion through said opening to prevent withdrawal of said bolt.

11. In a device as claimed in claim 10 wherein said locking means comprises an automatic bolt engaging latch.

12. In a device as claimed in claim 1 and means on said tractor for supporting said mounting plate in a vertical position.

13. In a device as claimed in claim 1 wherein said catch arm means comprises a pair of spaced parallel links each pivotally mounted at one end thereof on a common axis, an alignment plate pivotally mounted between the other ends of said links and having a substantially V-shaped recess in its upper edge, and a pair of rollers each pivotally mounted on said other ends of said links and engagable with the mounting plate.

14. In a device as claimed in claim 13 wherein said links are also pivotable laterally when in the lowered position, and means for guiding said links laterally during the movement of the catch arm means from its lowered to its raised position.

15. In a device as claimed in claim 13 wherein said catch arm means further comprises a pair of rods with hooks on the ends thereof and pivotally mounted from said other ends of said links, said hooks being engagable with said mounting plates.

16. In a device as claimed in claim 3 wherein said power lift means comprises a horizontally positioned bar, and means on the lower ones of said rod guide members for catching and retaining said power lift bar.

17. In a device as claimed in claim 1 wherein said mounting plate alignment means comprises a longitudinally extending bar having a downwardly directed substantially V-shaped notch therein.

18. In a device as claimed in claim 1 and means on said mounting plate defining a three-point attachment, and a traction coupler on said mounting plate.

* * * * *